US010750050B2

(12) United States Patent
Matsumoto

(10) Patent No.: US 10,750,050 B2
(45) Date of Patent: Aug. 18, 2020

(54) IMAGE PROCESSING APPARATUS, METHOD FOR CONTROLLING IMAGE PROCESSING APPARATUS, PROGRAM STORAGE MEDIUM, SYSTEM, AND METHOD FOR CONTROLLING SYSTEM FOR USE IN BIOMETRIC AUTHENTICATION

(71) Applicant: CANON KABUSHIKI KAISHA, Tokyo (JP)

(72) Inventor: Tetsuya Matsumoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/170,144

(22) Filed: Oct. 25, 2018

(65) Prior Publication Data

US 2019/0141214 A1 May 9, 2019

(30) Foreign Application Priority Data

Nov. 6, 2017 (JP) ................................. 2017-213554

(51) Int. Cl.
*H04N 1/44* (2006.01)
*H04N 1/00* (2006.01)
*G06F 3/12* (2006.01)

(52) U.S. Cl.
CPC ........... *H04N 1/442* (2013.01); *G06F 3/1222* (2013.01); *G06F 3/1238* (2013.01); *G06F 3/1288* (2013.01); *H04N 1/00352* (2013.01)

(58) Field of Classification Search
None
See application file for complete search history.

(56) References Cited

U.S. PATENT DOCUMENTS 10,609,254 B2 * 3/2020 Shirakawa ........... H04N 1/4406
2003/0217288 A1 * 11/2003 Guo ....................... G06F 21/33
726/10

(Continued)

FOREIGN PATENT DOCUMENTS

JP 2006163875 A 6/2006
WO WO-2017043717 A1 * 3/2017 ............... H04L 9/08

OTHER PUBLICATIONS

WO-2017043717-A1, English Translation (Year: 2017).*

*Primary Examiner* — Miya J Williams
(74) *Attorney, Agent, or Firm* — Rossi, Kimms & McDowell LLP

(57) ABSTRACT

An image processing apparatus provided with a biological information sensor receives an authentication request including a verification parameter from a service providing system, transmits the verification parameter to an information processing apparatus provided with an authentication module for biometric authentication, and a tamper-resistant storage device configured to store a user's biological information required when an authentication process is performed by the authentication module and a private key generated with respect to the biological information, transmits the biological information acquired by the biological information sensor using an encryption technique to the information processing apparatus, receives signature data, created using the private key extracted when biometric authentication based on the transmitted biological information has succeeded and the verification parameter, from the information processing apparatus, and transmits the signature data to the service providing system.

12 Claims, 13 Drawing Sheets

(56) References Cited

U.S. PATENT DOCUMENTS

| | | | |
|---|---|---|---|
| 2006/0064580 A1* | 3/2006 | Euchner | H04L 9/3263 |
| | | | 713/156 |
| 2014/0189779 A1* | 7/2014 | Baghdasaryan | H04L 63/08 |
| | | | 726/1 |
| 2016/0112422 A1* | 4/2016 | Watanabe | H04L 63/0838 |
| | | | 726/28 |
| 2016/0156598 A1* | 6/2016 | Alonso Cebrian | |
| | | | H04L 63/0838 |
| | | | 713/168 |
| 2018/0183586 A1* | 6/2018 | Bhargav-Spantzel | |
| | | | H04L 9/0861 |
| 2018/0191695 A1* | 7/2018 | Lindemann | H04L 63/0853 |
| 2018/0341759 A1* | 11/2018 | Sato | H04L 9/0894 |
| 2018/0351739 A1* | 12/2018 | Ota | H04L 9/3213 |

\* cited by examiner

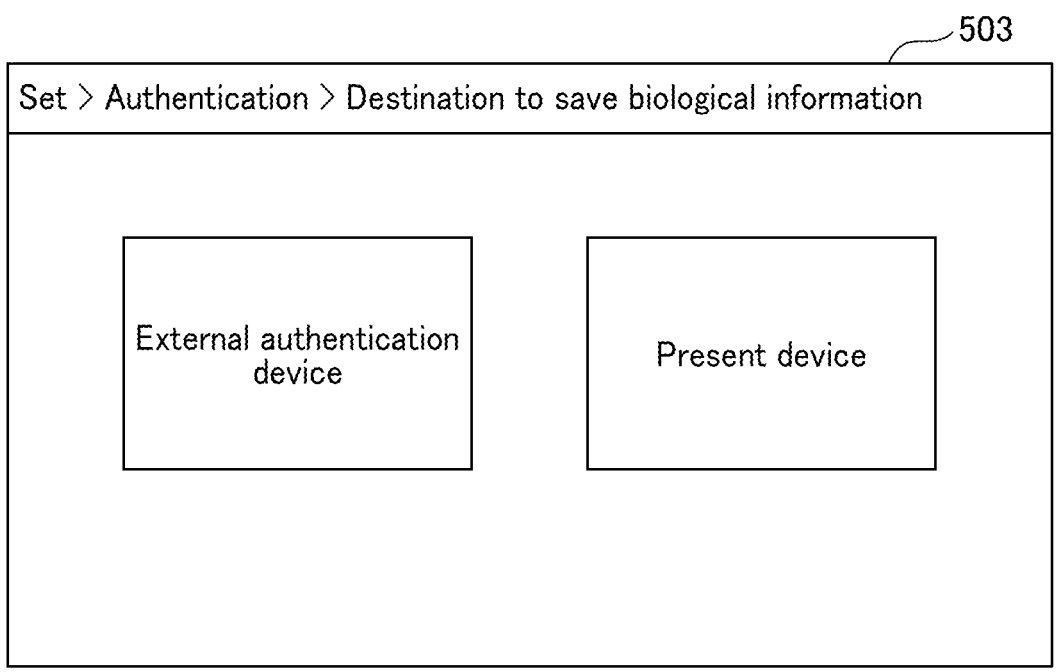

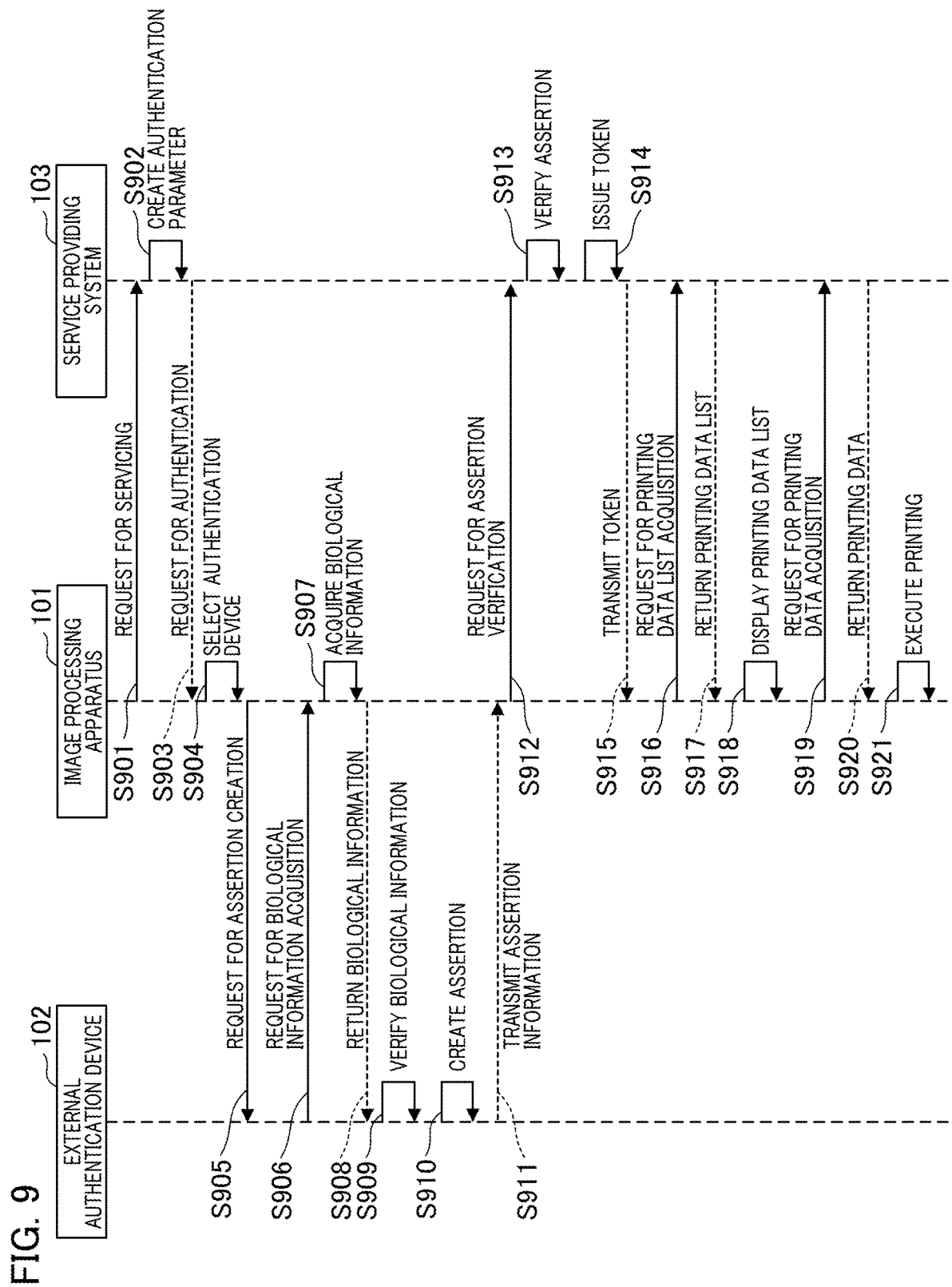

IMAGE PROCESSING APPARATUS, METHOD FOR CONTROLLING IMAGE PROCESSING APPARATUS, PROGRAM STORAGE MEDIUM, SYSTEM, AND METHOD FOR CONTROLLING SYSTEM FOR USE IN BIOMETRIC AUTHENTICATION

BACKGROUND OF THE INVENTION

Field of the Invention

The present invention relates to an image processing apparatus, a method for controlling an image processing apparatus, a program storage medium, a system, and a method for controlling a system.

Description of the Related Art

In recent years, as a new authentication system including biometric authentication, fast identity online (FIDO) has attracted attention. If biological information such as fingerprints or veins used in biometric authentication is leaked to the outside, because the information is not able to be rewritten unlike passwords in ID/password authentication in the related art, the information leakage is disastrous.

On the other hand, FIDO is configured to perform a registration process in advance between a device in a user's hand and a server that provides a web service. In the registration process, a private key associated with biometric authentication of a user is stored in a device that receives a service to be provided, and information such as authentication identification information associated with the biometric authentication or a public key pairing with the private key is registered with the server. The authentication is not performed on the server through the Internet, but is performed on a device in a user's hand, and thus authentication results signed using the private key flow on a network. That is, a case in which biological information flows on a network does not occur, and thus it may be said that the risk of information leakage is small.

Japanese Patent Laid-Open No. 2006-163875 discloses a biological information authentication apparatus that outputs a plurality of pieces of identification information allocated to a person to be authenticated who has input his or her biological information and service names corresponding to the identification information, and causes a user to select a service which is used by the user.

However, Japanese Patent Laid-Open No. 2006-163875 does not consider a case in which a plurality of information processing terminals provided with the biological information authentication apparatus are used. For example, an environment in which one user can use a plurality of devices such as multifunction peripherals (MFP) may be considered. In such an environment, if an authentication method such as the FIDO is applied, a user has to register his or her biological information with all devices that he or she uses.

SUMMARY OF THE INVENTION

The present invention provides an image processing apparatus improving user convenience in an environment where a user uses a plurality of devices, and realizing a secure authentication method.

According to an embodiment of the present invention, there is provided an image processing apparatus provided with a biological information sensor, a first receiving unit configured to receive an authentication request including a verification parameter from a service providing system on a network, a first transmission unit configured to transmit the verification parameter to an information processing apparatus provided with an authentication module for biometric authentication, and a tamper-resistant storage unit configured to store a user's biological information required when an authentication process is performed by the authentication module and a private key generated with respect to the biological information, a second transmission unit configured to transmit the biological information acquired by the biological information sensor using an encryption technique to the information processing apparatus, a second receiving unit configured to receive signature data, created using the private key extracted when biometric authentication based on the transmitted biological information has succeeded and the verification parameter, from the information processing apparatus, and a third transmission unit configured to transmit the signature data to the service providing system.

Further features of the present invention will become apparent from the following description of exemplary embodiments with reference to the attached drawings.

BRIEF DESCRIPTION OF THE DRAWINGS

FIGS. 5A to 5C are examples of UIs which are displayed during the setting of a destination to save biological information.

FIG. 9 is a sequence diagram illustrating a biometric authentication process.

DESCRIPTION OF THE EMBODIMENTS

Hereinafter, a mode for carrying out the present invention will be described with reference to the accompanying drawings or the like.

Meanwhile, the present invention relates to a structure in which biometric authentication is performed on a device in a user's hand (information processing apparatus) in order for a service on the web to authenticate a user, and as a result, the service authenticates the user. This can be realized by registering information associated with biometric authentication in a device in a user's hand, for example, authentication identification information, a public key, or the like, in advance, in a service on the web. An example of such a structure includes FIDO, but it should be noted that the present invention is not limited to the FIDO.

<System Configuration>

Figure 1:
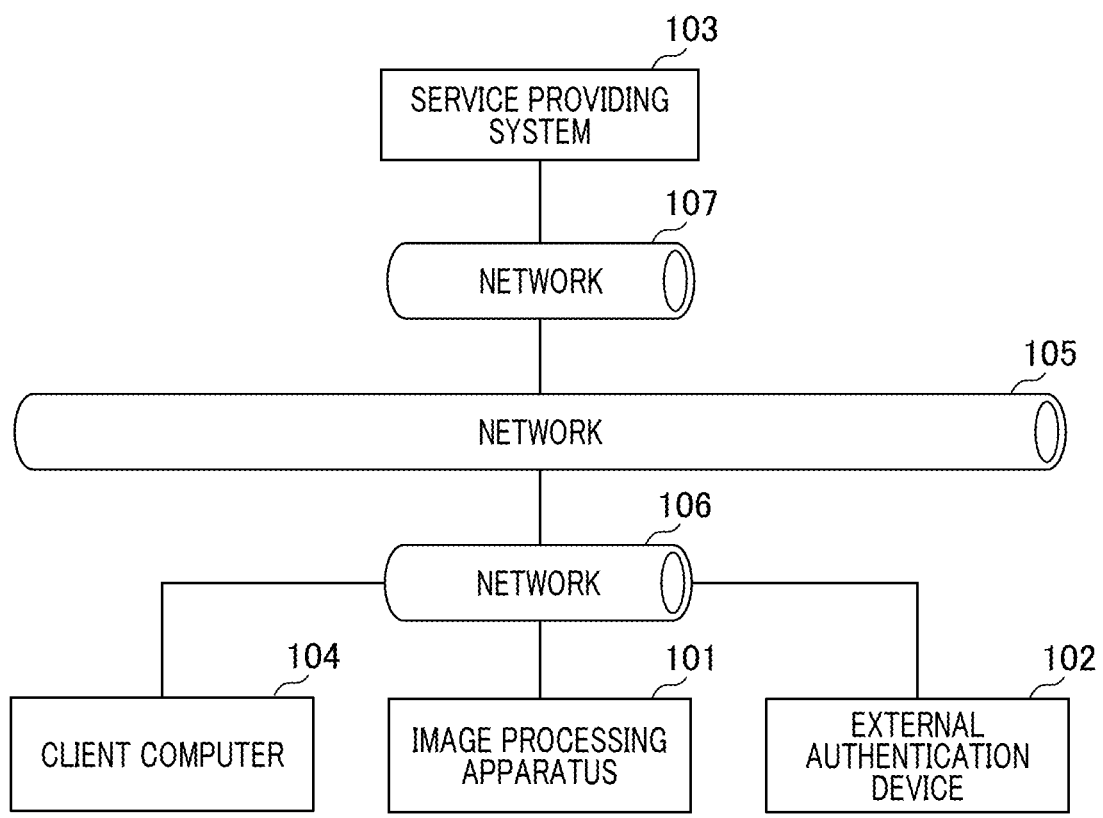
FIG. 1 is a diagram illustrating an example of an entire configuration of a system according to an embodiment of the present invention.

FIG. 1 is a diagram illustrating an example of an entire configuration of a system according to an embodiment of the present invention.

In FIG. 1, an image processing apparatus 101 is an example of a plurality of devices capable of being used by one user. The image processing apparatus 101 is, for example, a compound machine, a laser beam printer, an ink jet printer, or the like. Meanwhile, the present invention can also be applied to other devices without being limited to the image processing apparatus.

An external authentication device 102 is an information processing apparatus that executes biometric authentication as an authentication device of one or more image processing apparatuses 101. The external authentication device 102 is provided with an authentication module for biometric authentication, and a tamper-resistant storage device configured to store a user's biological information required when an authentication process is performed by the authentication module and a private key generated with respect to the biological information. The details of the authentication device will be described later.

A service providing system 103 is an external system that provides a service to an information processing apparatus such as the image processing apparatus 101 or a client computer 104 through networks 105 to 107. The service providing system 103 includes a web server that accepts various requests from the image processing apparatus 101 or the client computer 104, may be constituted by one server apparatus, and may be constituted by a plurality of apparatuses. In addition, a portion of or the entirety of the service providing system 103 may be constructed using a resource such as a virtual machine or a storage.

In the present embodiment, an example of a service which is provided by the service providing system 103 includes a printing service. The printing service provides a cloud printing service for holding various types of data such as document data or image data received through the networks 105 to 107, and providing the held data to the image processing apparatus 101 connected to the networks 105 to 107 to print the data.

A user who uses a printing service registers data printed in the image processing apparatus 101 with the service providing system 103 through the client computer 104. Thereafter, the user selects the printing data registered with the service providing system 103 in the image processing apparatus 101 to execute printing.

The client computer 104 is an information processing apparatus which is used by a user who uses a service, and may be a small-sized laptop computer or a tablet computer other than a so-called personal computer (PC), or a mobile terminal such as a smartphone.

The image processing apparatus 101, the external authentication device 102, the service providing system 103, and the client computer 104 are connected to each other through the networks 105 to 107. The networks 105 to 107 are any of a LAN, a WAN, a telephone line, a dedicated digital line, an ATM, a frame relay line, a cable television line, or a wireless line for data broadcasting such as, for example, the Internet.

In addition, the networks 105 to 107 are so-called communication networks which are realized by a combination thereof. The networks 105 to 107 can preferably have data transmitted and received therethrough. Meanwhile, in the present embodiment, the network 105 is the Internet, the network 106 is an intra-enterprise network, and the network 107 is a network of a service provider.

<Hardware Configuration of Image Processing Apparatus>

Figure 2:
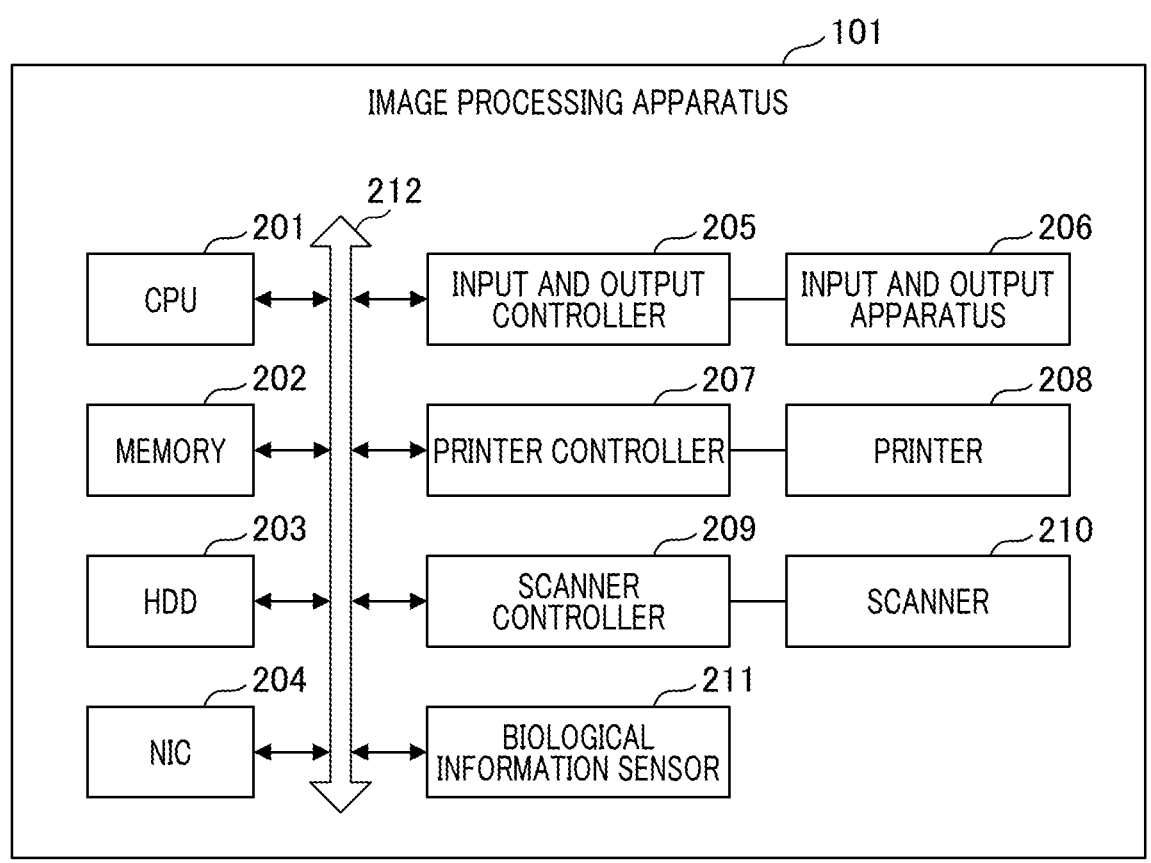
FIG. 2 is a diagram illustrating an example of a hardware configuration of an image processing apparatus.

FIG. 2 is a diagram illustrating an example of a hardware configuration of the image processing apparatus 101.

The image processing apparatus 101 includes a CPU 201 that executes a program stored on a hard disk drive (HDD) 203 which is a storage apparatus. The CPU 201 generally controls each processing unit which is connected to a system bus 212.

A memory 202 is a main memory of the CPU 201, and functions as a work area or the like. The HDD 203 stores data as a large-capacity storage apparatus. The HDD 203 has, for example, a program stored thereon, the program realizing a printing application 401 or a biometric authentication client 402 to be described later. A network interface card (NIC) 204 exchanges data unidirectionally or bidirectionally with other information processing apparatuses through a network.

The input and output controller 205 controls a plurality of input and output apparatuses 206 included in the image processing apparatus 101. Specifically, the input and output controller 205 accepts an input from an input apparatus such as a button or a touch panel, and transmits a signal corresponding to the input to each processing unit. In addition, the input and output controller 205 controls display on a display apparatus such as a liquid crystal display.

A printer controller 207 controls a printer 208 included in the image processing apparatus 101, and performs printing on real paper using a printing technique such as an electrophotographic technique or an inkjet technique. A scanner controller 209 controls a scanner 210 included in the image processing apparatus 101, and reads a paper manuscript. Meanwhile, a configuration in which the scanner controller 209 and the scanner 210 are not included may be used, depending on the role of the image processing apparatus 101.

A biological information sensor 211 is a sensor that reads a user's biological information, and reads, for example, information of a user's fingerprint, iris, or vein to convert the read information into a signal. The biological information sensor 211 can also be built into the image processing apparatus 101 in advance, and can have a sensor handling a necessary kind of biological information added thereto as necessary. In the present embodiment, a fingerprint reading sensor is assumed as the biological information sensor 211, but other biological information sensors such as a camera may be used. In addition, a configuration in which fingerprint information is read simultaneously with touching a touch panel or performing an input, and is converted into an electrical signal may be used.

<Hardware Configuration of Information Processing Apparatus>

Figure 3:
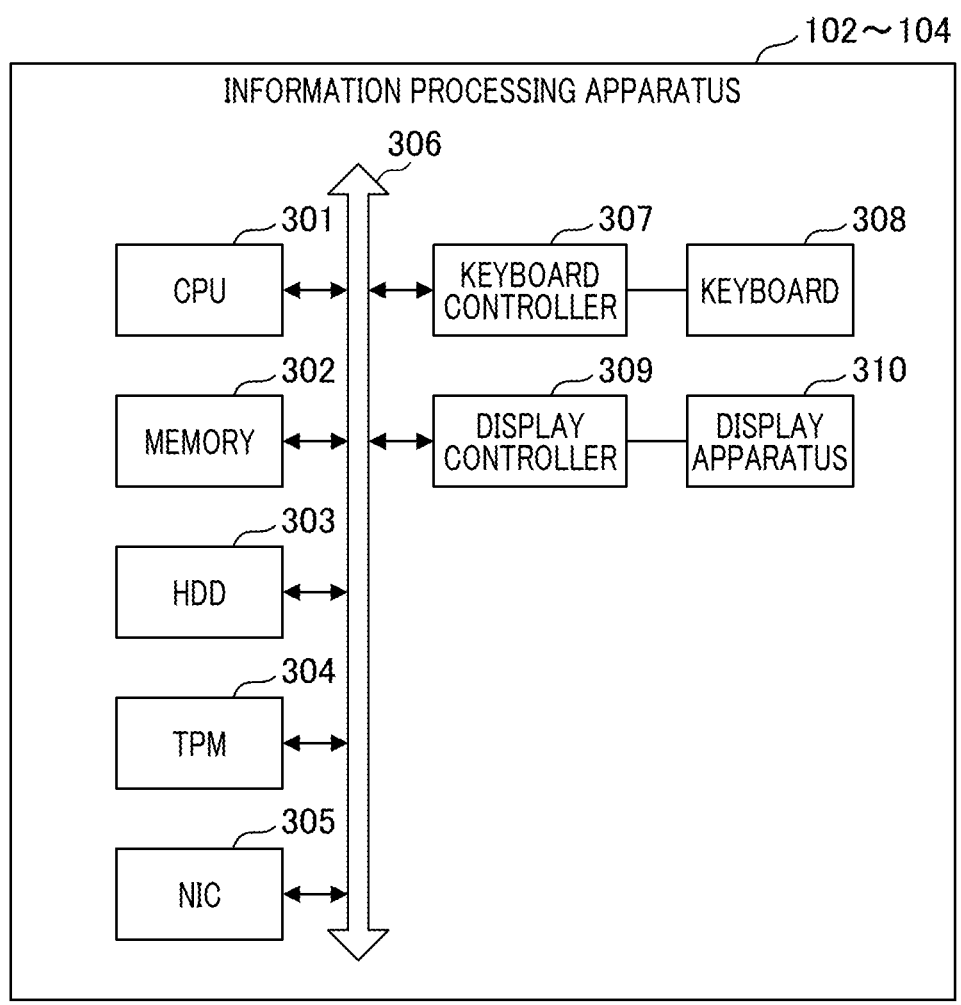
FIG. 3 is a diagram illustrating an example of a hardware configuration of an information processing apparatus.

FIG. 3 is a diagram illustrating an example of a hardware configuration of an information processing apparatus constituting each of the external authentication device 102, the service providing system 103, and the client computer 104.

The information processing apparatus includes a CPU 301 that executes a program stored in a hard disk drive (HDD) 303 which is a storage apparatus. The CPU 301 generally controls each processing unit which is connected to a system bus 306.

A memory 302 is a main memory of the CPU 301, and functions as a work area or the like. The HDD 303 stores data as a large-capacity storage apparatus. A trusted platform module (TPM) 304 is a tamper-resistant storage device (security chip) configured to prevent the stored data from being read from the outside for the purpose of processing or storing confidential information. In the present embodiment, the TPM 304 stores the feature amount of biological information or a private key to be described later. Meanwhile, the service providing system 103 and the client computer 104 may be configured such that the TPM 304 is not included therein.

A network interface card (NIC) 305 exchanges data unidirectionally or bidirectionally with other information processing apparatuses through a network. A keyboard controller 307 controls an input from an input apparatus such as, for example, a keyboard 308 or a pointing device which is not shown in the drawing.

Meanwhile, a configuration in which the keyboard controller 307 and the keyboard 308 are not included may be used, depending on the role of the information processing apparatus. A display controller 309 controls display on a display apparatus 310 such as, for example, a liquid crystal display. Meanwhile, a configuration in which the display controller 309 and the display apparatus 310 are not included may be used, depending on the role of the information processing apparatus.

<Functional Configuration>

Figure 4:
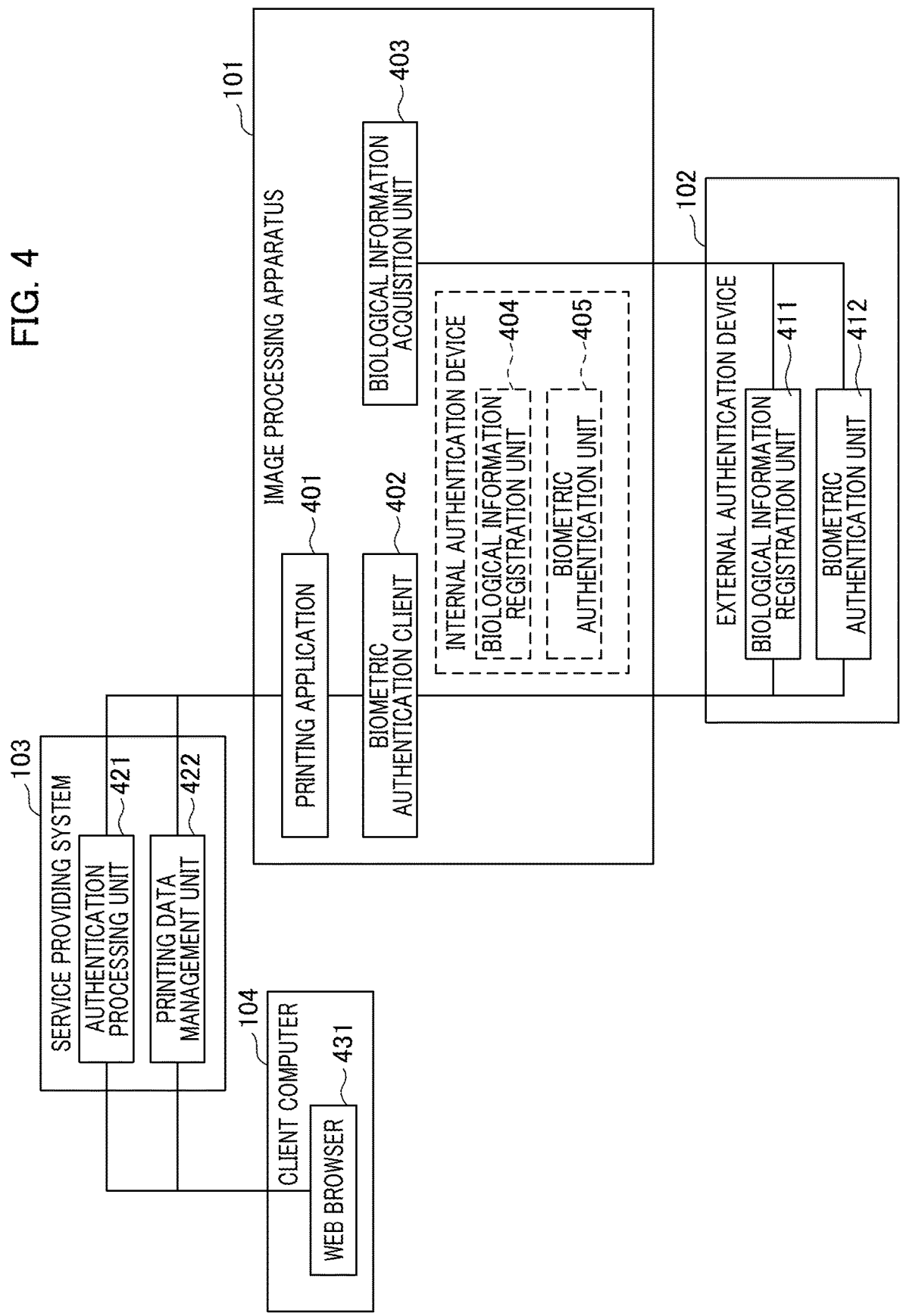
FIG. 4 is a diagram illustrating an example of a functional configuration of each apparatus.

FIG. 4 is a diagram illustrating an example of functional configurations of the image processing apparatus 101, the external authentication device 102, the service providing system 103, and the client computer 104.

The image processing apparatus 101 is constituted by a printing application 401, a biometric authentication client 402, and a biological information acquisition unit 403.

The printing application 401 is an application for providing a printing service to a user in collaboration with the service providing system 103. Specifically, the printing application 401 is used to provide a function of acquiring and printing the printing data from the service providing system 103 or a function of registering authentication information for a user to access a printing service with the service providing system 103.

The biometric authentication client 402 provides a function of controlling an authentication process required when a user uses a service such as a printing service. Meanwhile, in a system in which FIDO is applied as an authentication system, the biometric authentication client 402 corresponds to a FIDO client. The biological information acquisition unit 403 provides a function of requesting a user to input his or her biological information using the biological information sensor 211. A biological information registration unit 404 and a biometric authentication unit 405 in FIG. 4 will be described later.

The external authentication device 102 is constituted by a biological information registration unit 411 and a biometric authentication unit 412. The external authentication device 102 functions as an authentication module through the biological information registration unit 411 and the biometric authentication unit 412. The biological information registration unit 411 accepts a request for the creation of a credential from the printing application 401 or the like. The registration unit then executes a process of registering biological information for performing the creation of a pair of keys (private key and public key) or the creation of a credential. Meanwhile, the details of the process of registering biological information will be described later with reference to FIG. 7.

The biometric authentication unit 412 accepts a request for biometric authentication from an authentication processing unit 421 or the like of the service providing system 103 through the printing application 401, and executes a biometric authentication process for performing biometric authentication using the biological information transmitted from the image processing apparatus 101. Meanwhile, the details of the biometric authentication process will be described later with reference to FIG. 9. The external authentication device 102 executes the process of registering biological information and the biometric authentication process as an authentication device of one or more image processing apparatuses 101. In communication between each image processing apparatus 101 and the external authentication device 102, at least any of communication data and a communication path is encrypted.

Meanwhile, the image processing apparatus 101 may include the TPM 304, and the same functional configurations as the biological information registration unit 411 and the biometric authentication unit 412 therein. Configurations for realizing the same functions as those of the biological information registration unit 411 and the biometric authentication unit 412 in the image processing apparatus 101 are set to the biological information registration unit 404 and the biometric authentication unit 405, respectively, and these configurations are called an internal authentication device collectively.

If the image processing apparatus 101 includes an internal authentication device, the biometric authentication client 402 operates so as not to use the external authentication device 102 but to use internal authentication devices, that is, the biological information registration unit 404 and the biometric authentication unit 405 included in a host device, in accordance with a predetermined setting or the like. In addition, an external service, such as the service providing system 103, which requires authentication can also give instructions for a condition to be satisfied by the biometric authentication client 402, and determine an authentication device which is used by the biometric authentication client 402 on the basis of the condition.

Here, as cases of using the internal authentication device of the image processing apparatus 101, a case in which the number of users of the image processing apparatus 101 is few, a case where only one image processing apparatus 101 is present in an installation environment, and the like are considered. On the other hand, as cases of using the external authentication device, a case in which the image processing apparatus 101 does not have an internal configuration, such as the TPM 304, mounted therein which is a minimum requirement during the execution of an authentication process in the present embodiment, and the like are considered.

The service providing system 103 is constituted by the authentication processing unit 421 and a printing data management unit 422. The authentication processing unit 421 provides a function of registering information (authentication information) relating to an authentication function or authentication required for using various services provided by the service providing system 103. The printing data management unit 422 provides a function of registering printing data or a function of acquiring the printing data.

The client computer 104 includes a web browser 431. The web browser 431 provides a function of interpreting data of an HTML format and displaying a web page, or a function of accepting an input from a user and transmitting a request to the service providing system 103. In the present embodiment, the web browser 431 displays a web page for registering printing data provided by the service providing system 103. Further, the web browser 431 accepts a request for the registration of printing data from a user through the web page, and transmits the accepted request for registration to the service providing system 103.

<Setting of Destination to Save Biological Information>

Figure 5A:
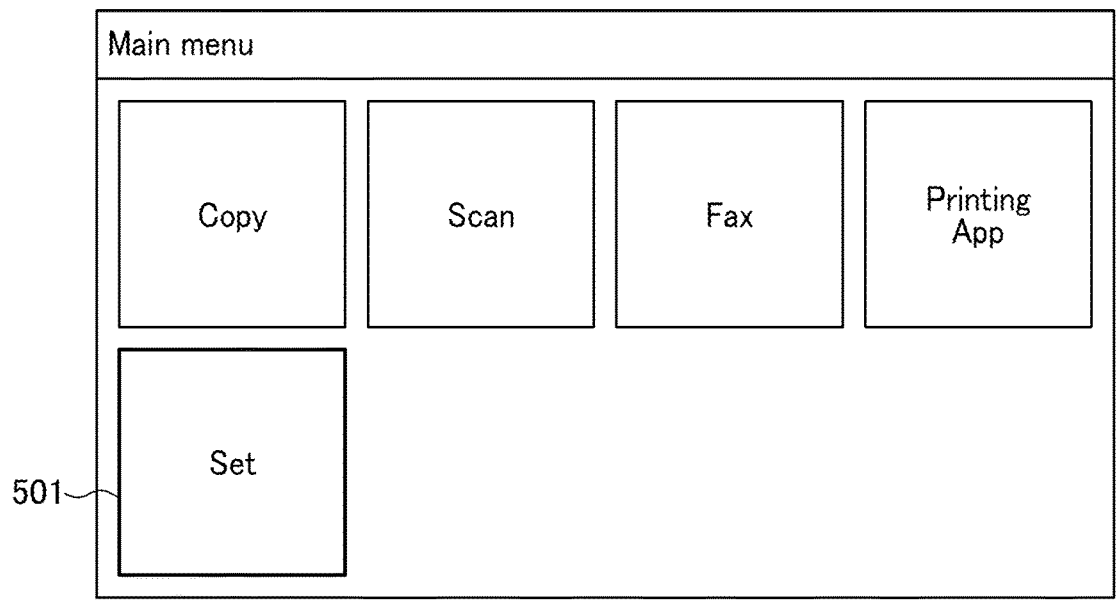
Figure 5B:
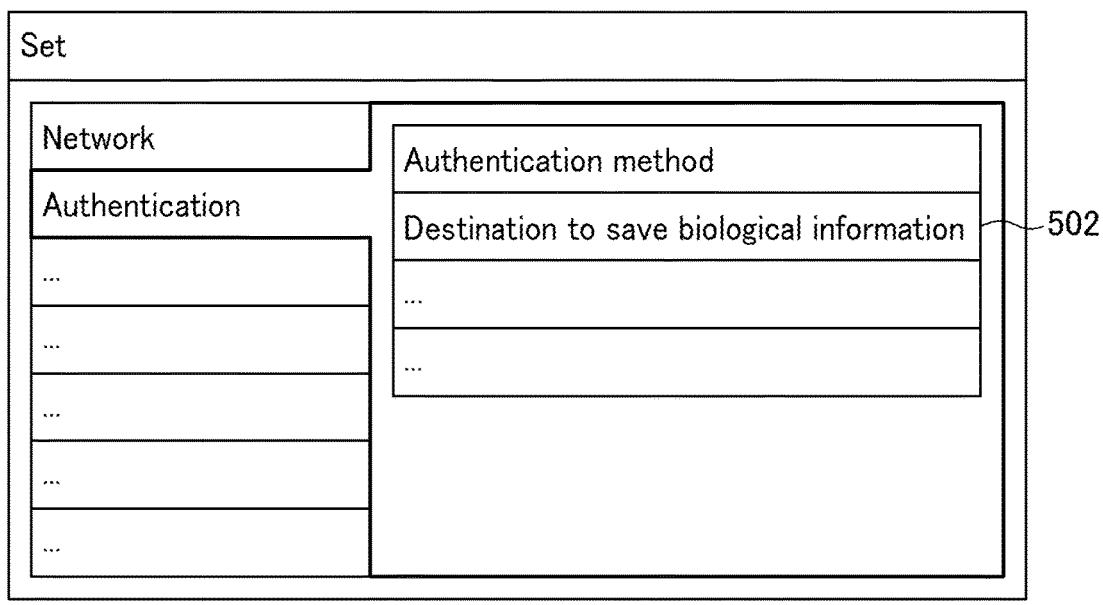

FIGS. 5A to 5C are examples of user interfaces (UIs) which are displayed during the setting of a destination to save biological information.

The setting of a destination to save biological information is a setting which is used for determining where biological information is saved in a process of registering biological information to be described later.

The present setting is assumed to be performed as an initial setting by a manager or the like when the image processing apparatus 101 is installed, or the like. In accordance with the present setting, when the authentication of a user based on the biometric authentication process is requested from the service providing system, the image processing apparatus 101 determines whether the biometric authentication process is performed in an internal authentication device included in the image processing apparatus 101 itself, or is performed in the external authentication device 102.

A manager accesses a setting 502 of a destination to save biological information from a setting menu 501 through a UI displayed on the input and output apparatus 206 of the image processing apparatus 101 (see FIG. 5A). Subsequently, the manager selects a "destination to save biological information" on a screen 503 (FIG. 5B), and next selects whether this saving destination is set to the external authentication device 102, or is set to a host device ("present device") (FIG. 5C).

If a destination to save biological information is selected, the biometric authentication client 402 of the image processing apparatus 101 registers the selected destination to save biological information with the memory 202 or the HDD 203. If the manager selects "external authentication device" on the screen 503, it is determined that biological information is saved in the TPM 304 included in the external authentication device 102, in a process of registering biological information to be described later. On the other hand, if the manager selects "present device" on the screen 503, it is determined that biological information is saved in the TPM 304 (not shown in FIG. 2) included in the image processing apparatus 101, in a process of registering biological information to be described later.

<Process of Registering Biological Information>

Next, a process of registering biological information will be described with reference to FIGS. 6A to 6F and FIG. 7.

The process of registering biological information is a process of registering biological information used when the image processing apparatus 101 or a service used through the image processing apparatus 101 requires authentication based on the biometric authentication process.

Meanwhile, the biological information can include various types of information associated with biological information, in addition to biological information itself such as information of a fingerprint, an iris, or a vein read by the biological information sensor 211. For example, biological information which is transmitted to the external authentication device 102 or an internal authentication device by the biometric authentication client 402 of the image processing apparatus 101 in a process of registering biological information is not the biological information itself read by the biological information sensor 211, but is the feature amount of the biological information. The details thereof will be described below.

FIGS. 6A to 6F are examples of user interfaces (UIs) which are displayed on the input and output apparatus 206 of the image processing apparatus 101 during the execution of a process of registering biological information. In addition, FIG. 7 is a sequence diagram illustrating a process of registering biological information. In FIG. 7, as an example, a case will be described in which, in order for a user to use a printing service which is provided by the service providing system 103, a process of registering biological information is executed with a request for the registration of user information to the service providing system 103. The user information includes information such as a user ID or a password, and authentication information used in user authentication during a user's use of a service.

Figure 6A:
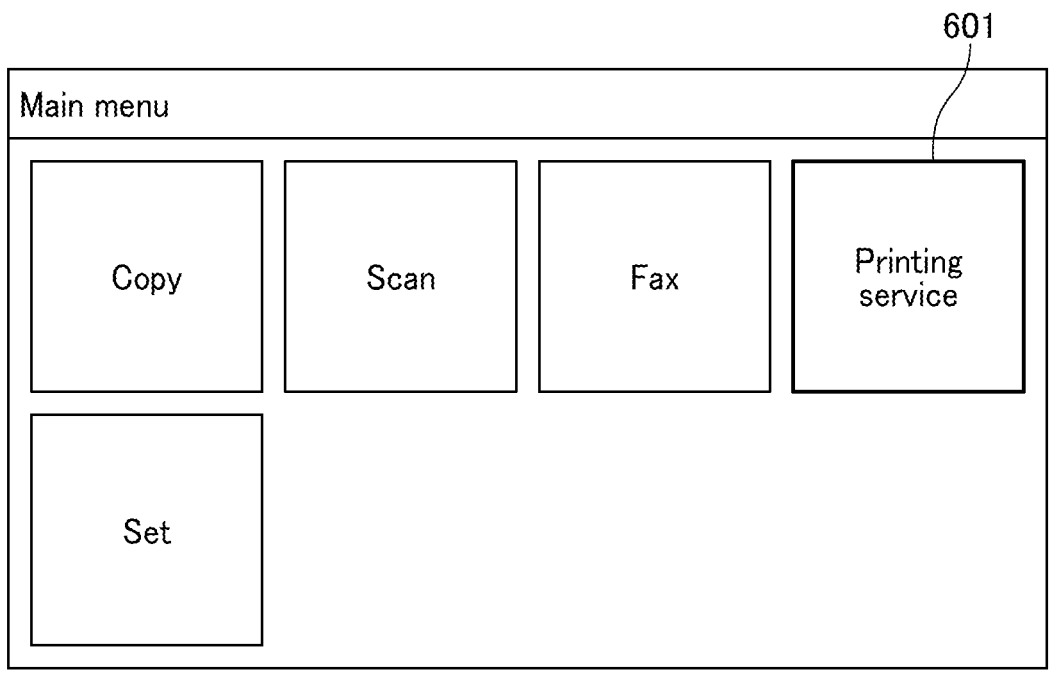
FIGS. 6A to 6F are examples of UIs which are displayed during the execution of a process of registering biological information.
Figure 6B:
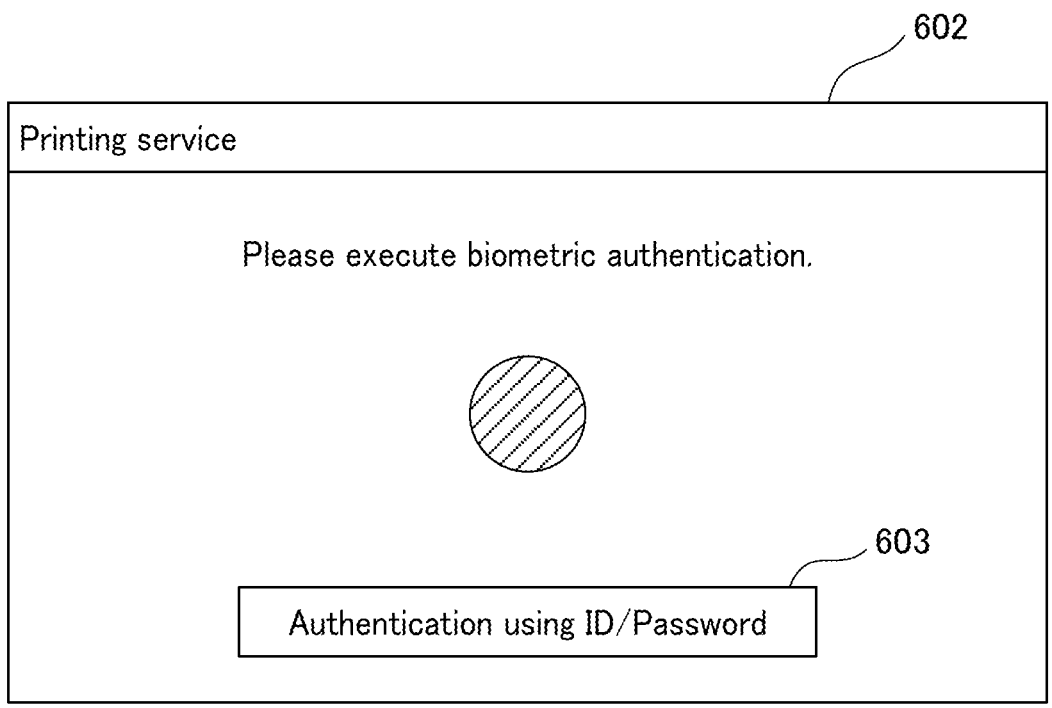
Figure 6C:
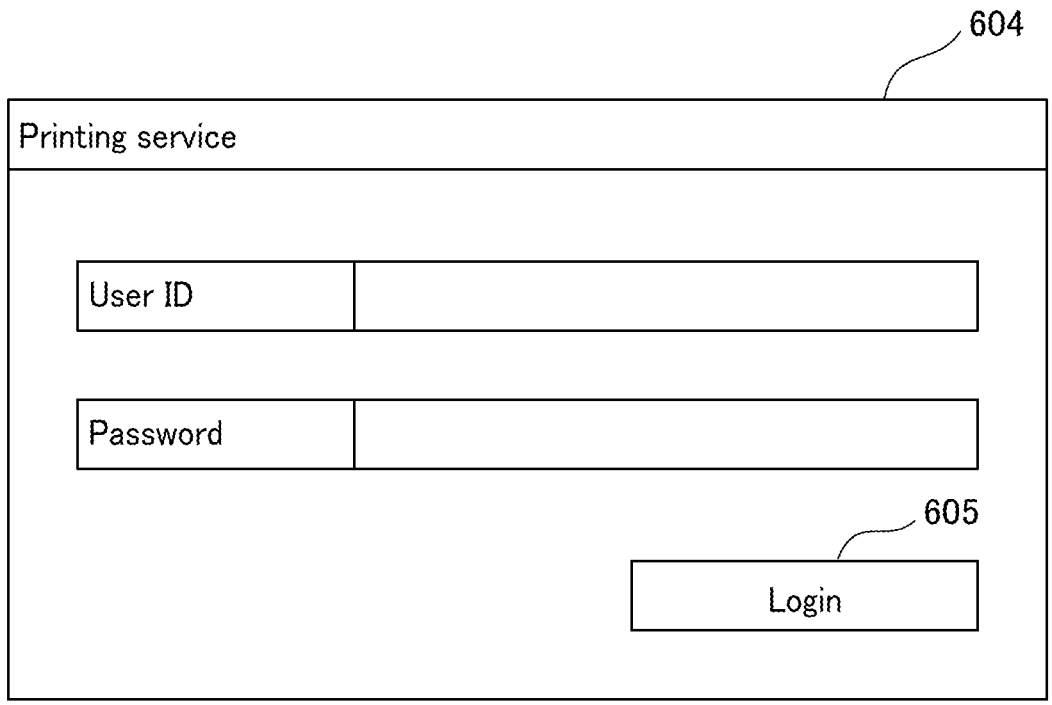
Figure 6D:
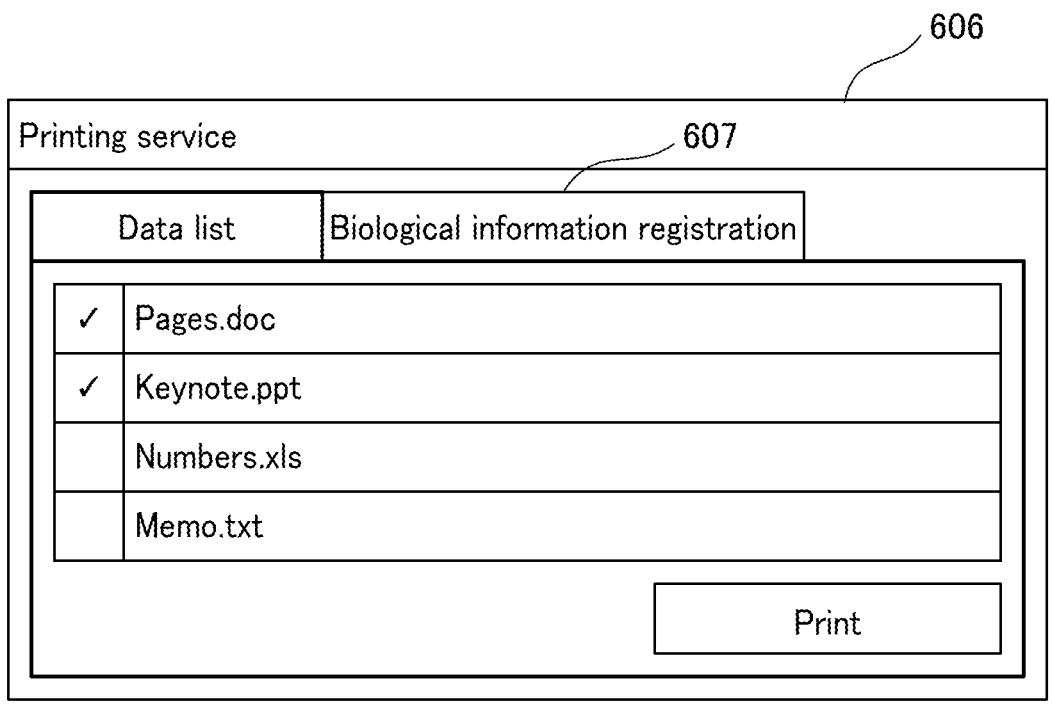
Figure 6E:
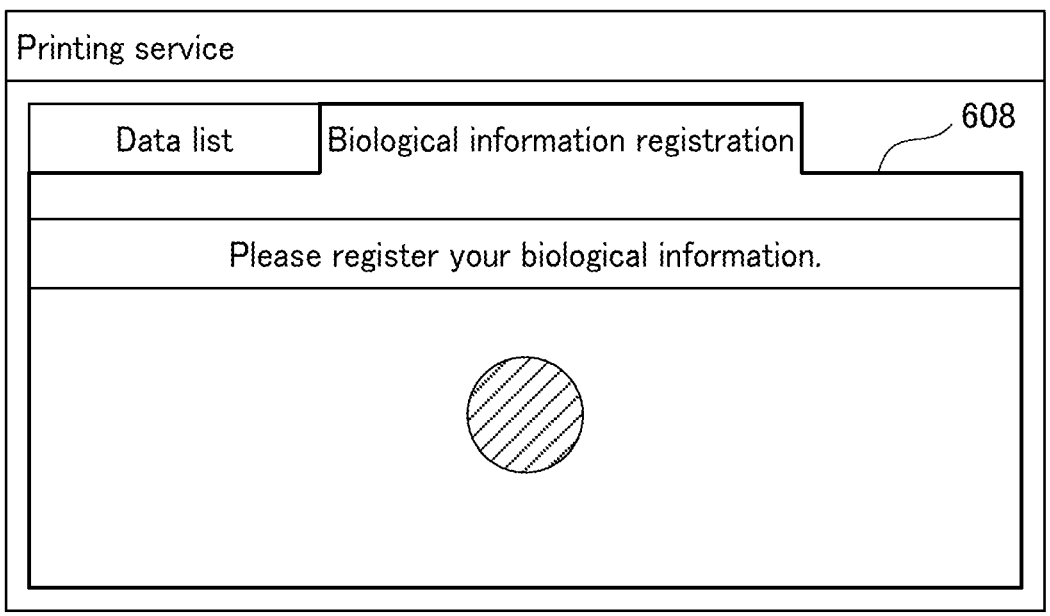
Figure 6F:
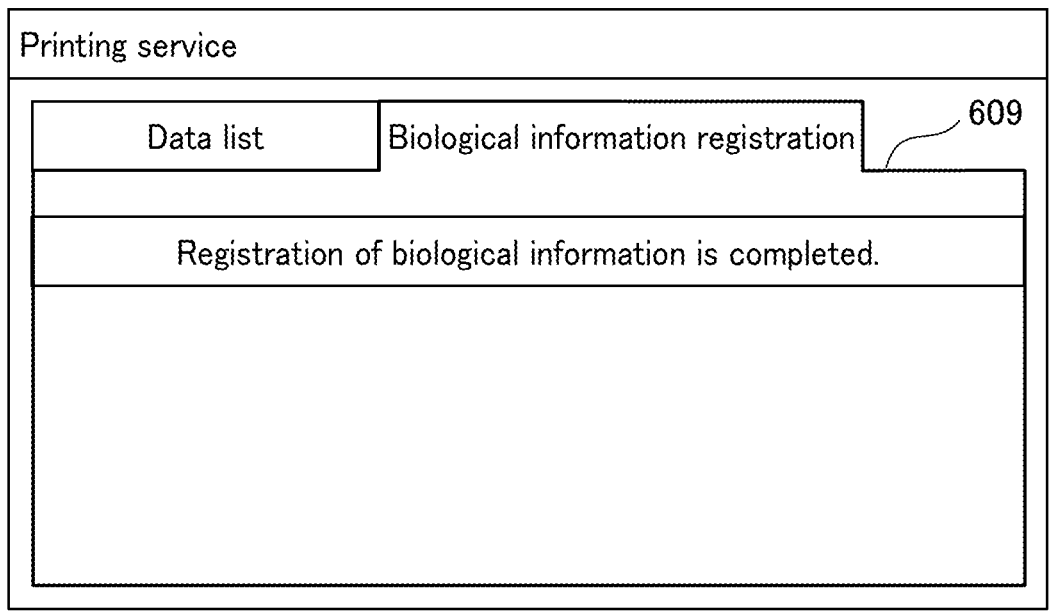
Figure 7:
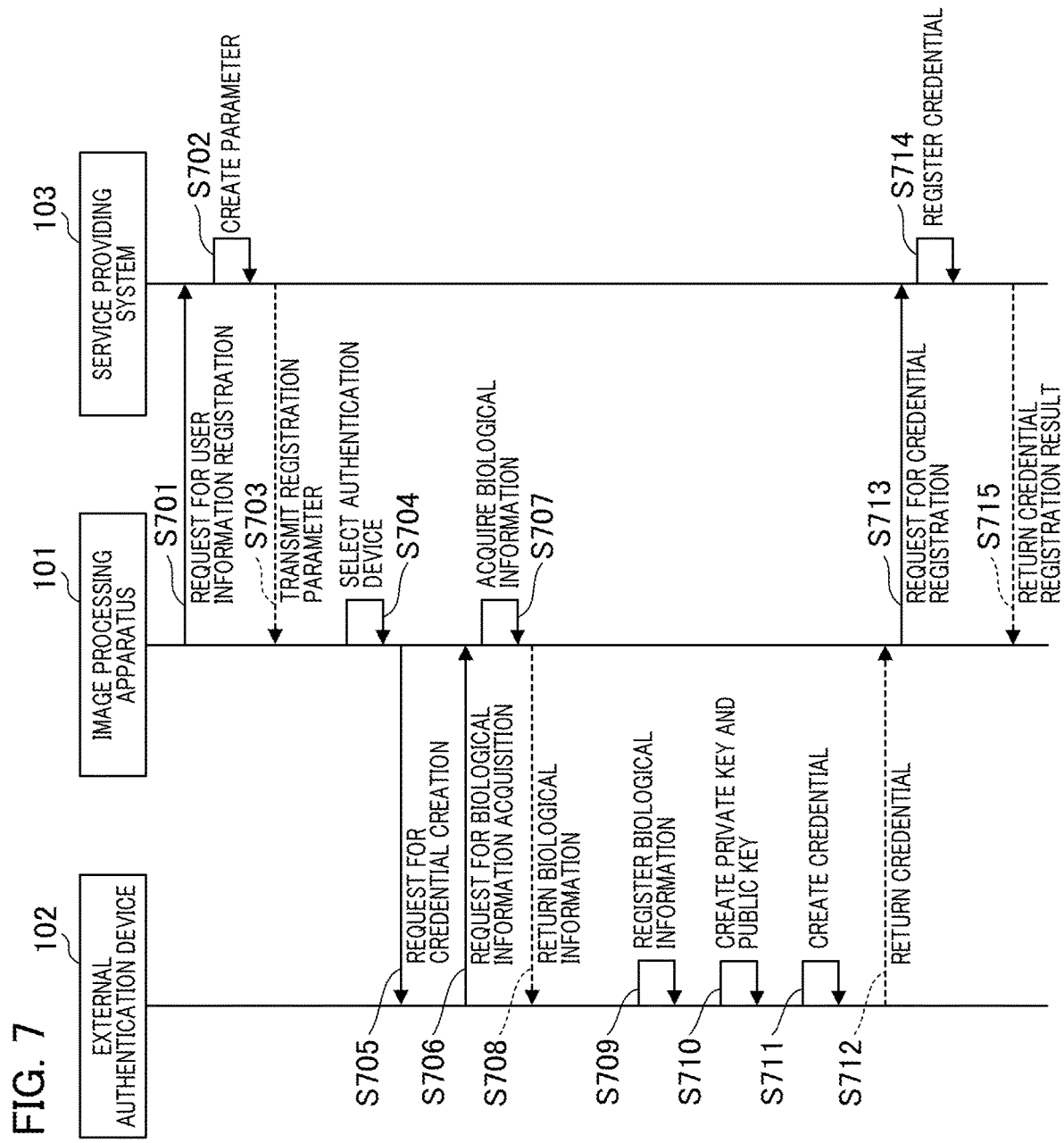
FIG. 7 is a sequence diagram illustrating a process of registering biological information.
Figure 8A:
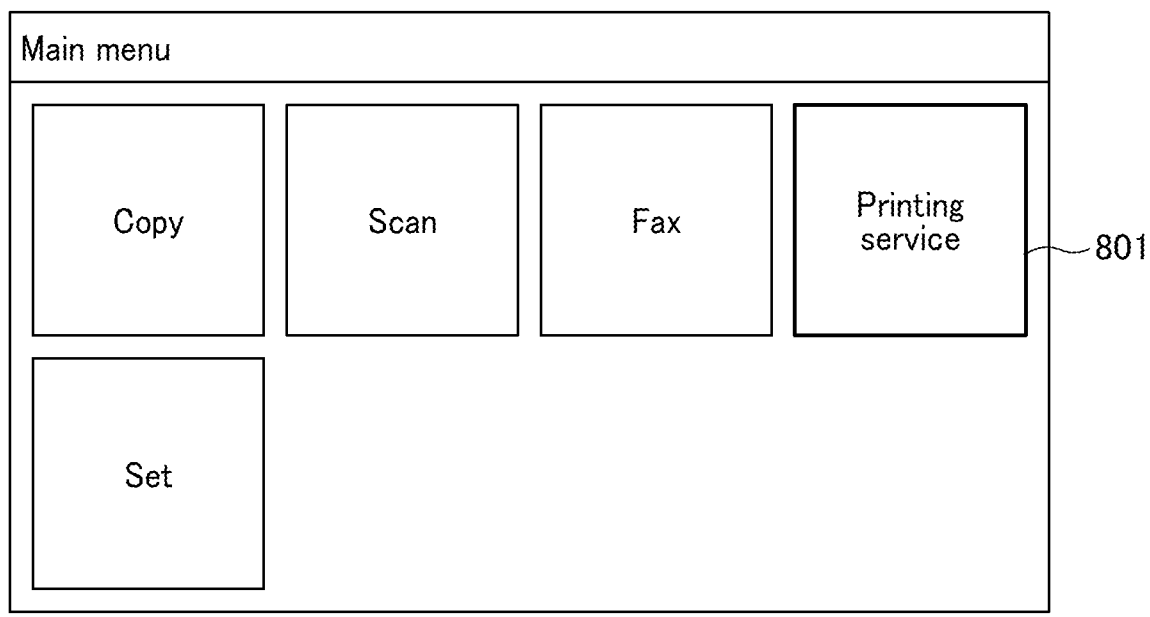
FIGS. 8A to 8D are examples of UIs which are displayed during use of a service.
Figure 8B:
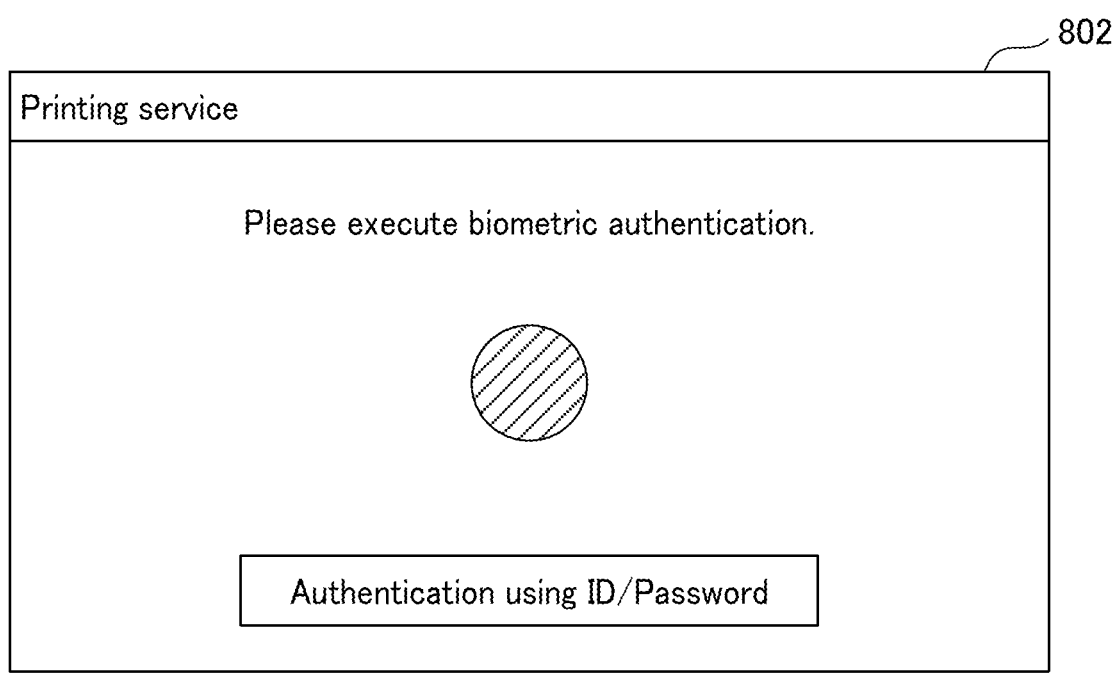
Figure 8C:
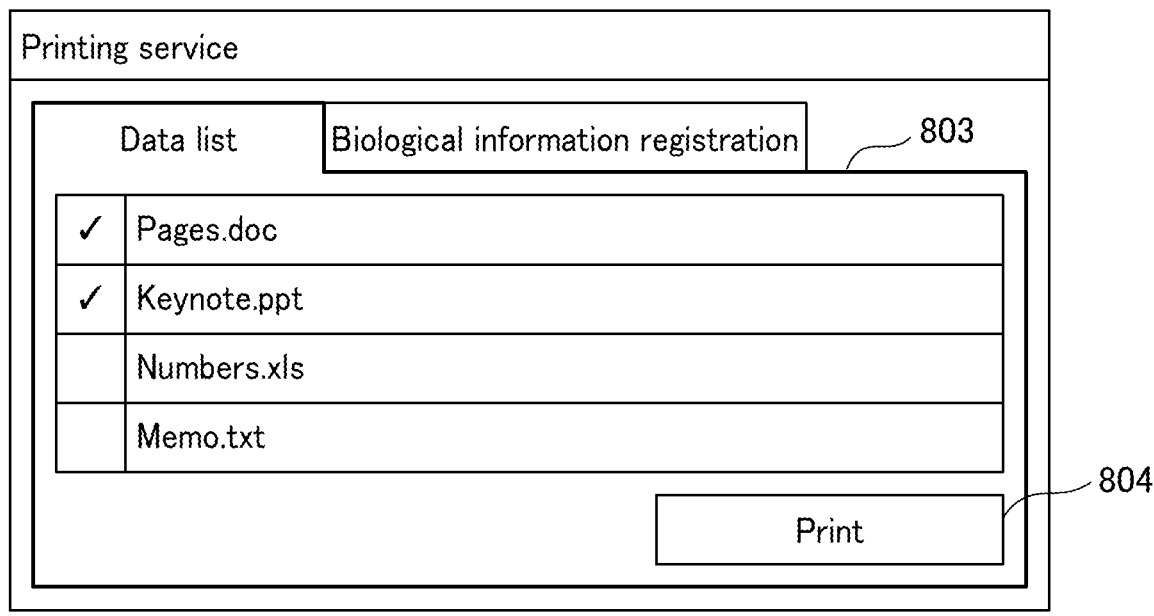
Figure 8D:
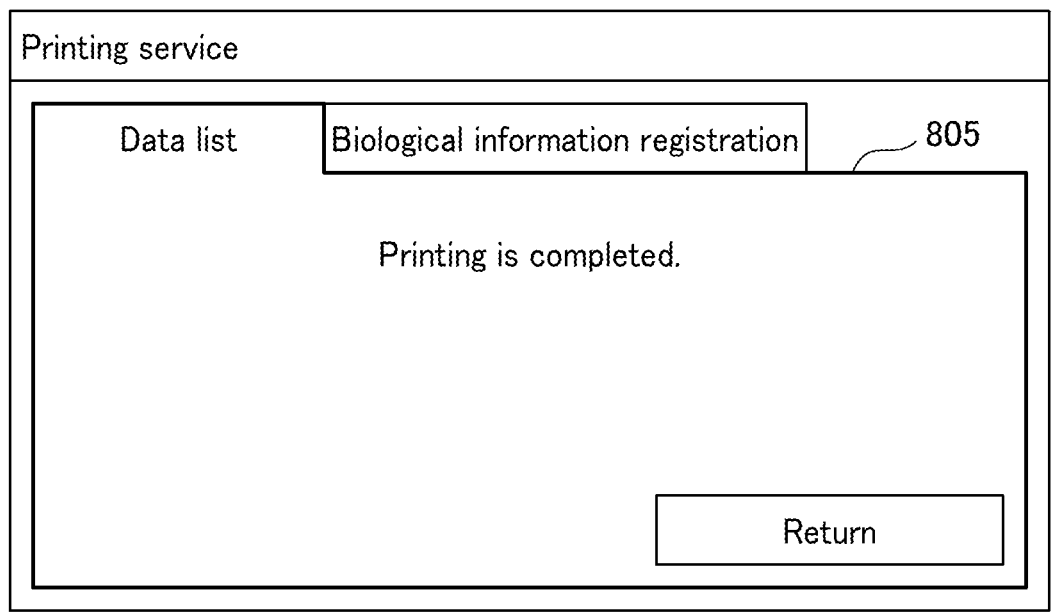

First, a user selects a "printing service" 601 on a menu screen displayed on the input and output apparatus 206 of the image processing apparatus 101 (FIG. 6A). If the printing service is selected, the printing application 401 of the image processing apparatus 101 displays a screen 602 (FIG. 6B) for requesting user authentication on the input and output apparatus 206. Here, in registering biological information, a user selects "authentication using ID/password" 603.

If "authentication using ID/password" 603 is selected, the printing application 401 of the image processing apparatus 101 displays an input screen 604 (FIG. 6C) of a user ID and a password on the input and output apparatus 206, and waits until a user inputs his or her ID and password. The user ID is an ID for uniquely identifying a user within a printing service.

If the user ID and the password are input, and a log-in button 605 is pressed, the printing application 401 of the image processing apparatus 101 requests authentication using the user ID and password from the service providing system 103. If the authentication using the user ID and password succeeds, the printing application 401 displays a screen 606 (FIG. 6D) of a printing service on the input and output apparatus 206. On the other hand, if the authentication using the user ID and password fails, the printing application 401 displays a screen indicating an authentication error which is not shown in the drawing on the input and output apparatus 206, and the registration process is terminated.

Subsequently, in performing the registration process, a user selects a biological information registration tab 607 on the screen 606 (FIG. 6D) of a printing service. If the biological information registration tab 607 is selected, the printing application 401 of the image processing apparatus 101 starts the process of registering biological information shown in FIG. 7. In FIG. 7, in step S701, the printing application 401 of the image processing apparatus 101 transmits a request for the registration of biological information, required for using a service provided by the service providing system 103 to the service providing system 103.

In step S702, the authentication processing unit 421 of the service providing system 103 creates a registration parameter. The registration parameter is data used when the service providing system 103 executes the registration of a credential. The external authentication device 102 provided with an authentication module or an internal authentication device included in the image processing apparatus 101 itself receives the registration parameter through the printing application 401, and creates a credential using data included in the registration parameter. The service providing system 103 registers the credential with the system itself, and uses the credential in user authentication when a user uses a service.

The service providing system 103 receives a credential through the printing application 401, and verifies that the registration request (S701) from the printing application 401 is not an illegitimate request on the basis of the credential.

The registration parameter includes an Attestation Challenge. The Attestation Challenge is data for verification which is used for performing challenge-response authentication. The data for verification, that is, the Attestation Challenge, is created when the registration parameter is created in step S702. The created Attestation Challenge is managed by the service providing system 103 in association with a user ID, an expiration date, or the like.

Meanwhile, the registration parameter may include the following data in addition to the Attestation Challenge. For example, the registration parameter can include account information, an encryption parameter, or the like. The account information is a user ID having succeeded in authentication in step S701 in a printing service, attribute information associated with the user ID, or the like.

The encryption parameter is attribute information, such as an encryption algorithm supported by a printing service, which relates to authentication information to be registered. In addition, the registration parameter may include, for example, a parameter for controlling the operation of an authentication device or the like, as an extended parameter capable of being designated by a printing service.

In step S703, the authentication processing unit 421 returns information including the registration parameter created in step S702 to the image processing apparatus 101. In step S704, the printing application 401 of the image processing apparatus 101 receives the information including the registration parameter. The biometric authentication client 402 then selects an authentication device. Here, if the external authentication device is set as a saving destination in the setting of a destination to save biological information described above, the biometric authentication client 402 selects the external authentication device 102 as an authentication device.

On the other hand, if the present device (image processing apparatus 101 itself) is set as a saving destination in the setting of a destination to save biological information, the biometric authentication client 402 selects an internal authentication device of a host device as an authentication device. Meanwhile, in the following step, a case in which the external authentication device 102 is selected will be described.

In step S705, the biometric authentication client 402 of the image processing apparatus 101 transmits a request for the creation of a credential to the external authentication device 102. The registration parameter created in step S702, that is, the Attestation Challenge, is included in the request. In addition, a service ID and biological information acquisition destination information are included in the request.

The service ID is an ID for uniquely identifying a service, and has domain information of a service used therein. Here, domain information indicating a printing service is stored as the service ID. In addition, the biological information acquisition destination information is information used for the external authentication device 102 to determine a transmission destination of a request for the acquisition of biological information to be described later. Specifically, the biological information acquisition destination information includes information indicating the address of the image processing apparatus 101 that performs a request for the creation of a credential, in other words, the image processing apparatus 101 instructed by a user to execute the process of registering biological information in step S701.

This is because, in order to input biological information using the biological information sensor 211 of the image processing apparatus in the image processing apparatus 101 instructed by a user to execute a process of registering biological information, the external authentication device 102 is required to transmit the request for the acquisition of biological information to the image processing apparatus. Therefore, the biometric authentication client 402 includes the biological information acquisition destination information in the request for the creation of a credential.

In step S706, the biological information registration unit 411 of the external authentication device 102 transmits the request for the acquisition of biological information to the image processing apparatus 101 indicated by the biological information acquisition destination information included in the request received in step S705. In step S707, the biological information acquisition unit 403 of the image processing apparatus 101 displays a screen 608 (FIG. 6E) for requesting an input of biological information on the input and output apparatus 206, and waits until a user inputs his or her biological information.

If a user's biological information is input, in step S708, the biological information acquisition unit 403 acquires the feature amount of the input biological information, and returns the feature amount as biological information to the external authentication device 102. The feature amount of biological information is obtained by converting the pattern of a fingerprint, the shape of an iris, the form of a vein, a voiceprint, or the like unique in an individual into a value without damaging uniqueness. In the biometric authentication, an individual is specified using the feature amount unique in the individual.

Meanwhile, communication from the image processing apparatus 101 to the external authentication device 102 in step S708 is performed using an encryption technique. For example, an SSL or the like for encrypting a communication path is used, but there is no limitation thereto. In addition, in step S708, it is preferable that the biological information transmitted from the image processing apparatus 101 to the external authentication device 102 is encrypted and transmitted using an encryption technique so that only the external authentication device 102 can perform decryption.

In step S709, regarding the received biological information, the biological information registration unit 411 of the external authentication device 102 generates biological information ID for uniquely identifying the biological information, and registers (stores) a combination of the biological information ID and the biological information with the TPM 304. In step S710, the biological information registration unit 411 creates a pair of private key and public key. In addition, the biological information registration unit 411 generates an authentication information ID for uniquely identifying a combination of the service ID, the biological information ID, the created private key.

The biological information registration unit 411 registers a combination of the authentication information ID, the service ID, the biological information ID, and the created private key, as authentication information, with the TPM 304. Table A shown below is an example of a table for managing authentication information registered or stored in the TPM 304. In the table shown in Table A, one record indicates the entry of one piece of authentication information. A record is created when the image processing apparatus 101 registers biological information with the external authentication device 102, and is added to the table.

TABLE A

| Authentication information ID | Service ID | Biological information ID | Private key |
|---|---|---|---|
| 10001 | print-service.com | d493a744 | 1faea2da-a269-4fa7-812a-509470d9a0cb |
| 10002 | print-service.com | dcc97daa | d7ae30c8-3775-4706-8597-aaf681bc30f5 |
| 10003 | x-service.com | 51caacaa | 36ae5eed-732b-4b05-aa7b-4dddb4be3267 |
| ... | ... | ... | ... |

In step S711, the biological information registration unit 411 creates a credential. The credential includes an authentication information ID, a public key, and Attestation (signature data). The authentication information ID and the public key are generated in step S710. In addition, the Attestation is data by obtained by encrypting the Attestation Challenge included in the request for the creation of a credential received in step S705 using the private key generated in step S710.

The credential may include other information. For example, the credential may include information or the like relating to an algorithm used when the key pair is created in step S710.

In step S712, the biological information registration unit 411 returns the credential created in step S711 to the image processing apparatus 101. In step S713, the biometric authentication client 402 of the image processing apparatus 101 receives the credential. The printing application 401 of the image processing apparatus 101 then transmit a request for credential registration to the service providing system 103. The request for credential registration includes the credential received in step S712.

In step S714, the authentication processing unit 421 of the service providing system 103 executes a process of registering a credential. In the process of registering a credential, first, Attestation included in the received credential is decrypted using a public key included in the same credential, and it is verified that the request for registration is not illegitimate.

Further, if it is verified that the request for credential registration is not illegitimate, the authentication processing unit 421 registers a combination of an authentication information ID and a public key included in a credential with a user ID associated with the credential, with a table as shown in Table B. Here, the user ID to be registered is a user ID which is input on the input screen 604 (FIG. 6C) of a user ID and a password. That is, this is a user ID of a user who gives instructions for the execution of a process of registering biological information.

Table B shown below is an example of a table for managing a registered credential. In the table shown in Table B, one record indicates one credential. A record is created when the service providing system 103 performs the registration of a credential, and is added to the table. In the table shown in Table A and the table shown in Table B, in a private key and a public key having the same value of the authentication information ID, data encrypted using the private key of Table A can be decrypted using the public key of Table B.

TABLE B

| Authentication information ID | User ID | Public key |
|---|---|---|
| 10001 | user-a | AC43C5FB-BFA2-48D1-A71B-FB04ACDA347A |
| 10002 | user-b | 8143CA9F-35C9-4333-948F-BFCE66A74310 |
| ... | ... | ... |

In step S715, the authentication processing unit 421 returns the result of the process of registering a credential executed in step S714 to the image processing apparatus 101. If a credential is correctly registered, the printing application 401 of the image processing apparatus 101 displays a screen 609 (FIG. 6F) indicating the completion of registration of biological information on the input and output apparatus 206, and terminates the process shown in FIG. 7. On the other hand, if the credential is not correctly registered, the printing application 401 displays a screen (not shown) indicating a failure of registration of biological information on the input and output apparatus 206, and terminates the process shown in FIG. 7.

Hereinafter, a supplementary description will be given of a case in which, in step S704, the biometric authentication client 402 of the image processing apparatus 101 selects an internal authentication device as an authentication device, in accordance with the setting of a destination to save biological information. In this case, processes of steps S705 to S712 are performed by the internal authentication device of the image processing apparatus 101 itself instead of the external authentication device 102.

A difference depending on whether the processes of steps S705 to S712 are performed by the external authentication device 102 or performed by the internal authentication device lies in the following point. If the processes are performed by the external authentication device 102 rather than the internal authentication device, the point is that an encryption process is performed in communication between the image processing apparatus 101 and the external authentication device 102, particularly, as in step S708.

In the process shown in FIG. 7, the biological information is registered with the external authentication device 102 functioning as an authentication device of one or more image processing apparatuses rather than the image processing apparatus 101. Thereby, a user does not need to register biological information with a separate image processing apparatus 101 using the external authentication device 102, and thus can reduce time and labor taken to register biological information. Therefore, in an environment where a user uses a plurality of image processing apparatuses 101, it is possible to improve user convenience, and to realize a secure authentication method.

<Biometric Authentication Process>

Next, a biometric authentication process will be described with reference to FIGS. 8A to 8D and FIG. 9.

The biometric authentication process is executed when a user uses a service which is provided by the service providing system 103. Here, a case in which a user uses a printing service which is provided by the service providing system 103 will be described by way of example. Specifically, the biometric authentication process is executed if a user selects printing data registered with the service providing system 103 in the image processing apparatus 101, and uses a service for executing printing.

Meanwhile, on the premise of using a printing service, a user is assumed to register data desired to be printed in the image processing apparatus 101 through the web browser 431 of the client computer 104, in advance, with the service providing system 103. In addition, on the premise of using a printing service, a user is assumed to execute the process of registering biological information described above. That is, a user's biological information is assumed to be registered with the external authentication device 102.

FIGS. 8A to 8D are examples of UIs which are displayed on the input and output apparatus 206 of the image processing apparatus 101 during use of a printing service. In addition, FIG. 9 is a sequence diagram illustrating a biometric authentication process.

First, a user selects a "printing service" 801 on a menu screen (FIG. 8A) which is displayed on the input and output apparatus 206 of the image processing apparatus 101. If the printing service is selected, the printing application 401 of the image processing apparatus 101 starts the biometric authentication process shown in FIG. 9.

In FIG. 9, in step S901, the printing application 401 of the image processing apparatus 101 transmits a request for servicing to the service providing system 103. In step S902, the authentication processing unit 421 of the service providing system 103 creates an authentication parameter. The authentication parameter is data uses when the service providing system 103 performs the authentication of a user who uses a printing service. The authentication parameter includes an Assertion Challenge.

The Assertion Challenge is data for verification which is used for performing challenge-response authentication. The Assertion Challenge is created when the authentication parameter is created in step S902. The created Assertion Challenge is managed by the service providing system 103 in association with a user ID, an expiration date, or the like. Meanwhile, the authentication parameter may include, for example, a parameter for controlling the operation of an authentication device or the like, as an extended parameter capable of being designated by a printing service, in addition to the Assertion Challenge.

In step S903, the authentication processing unit 421 performs a request for biometric authentication. In this case, the authentication processing unit 421 includes information of the authentication parameter generated in step S902, in the request. In addition, the authentication processing unit 421 includes a service ID and a user ID of a user who has performed a request for servicing, in the request.

In step S904, the printing application 401 of the image processing apparatus 101 receives the authentication parameter. The biometric authentication client 402 selects an authentication device. Here, if the external authentication device is set as a saving destination in the setting of a destination to save biological information described above, the biometric authentication client 402 selects the external authentication device 102 as an authentication device.

On the other hand, if the present device (image processing apparatus 101 itself) is set as a saving destination in the setting of a destination to save biological information, the biometric authentication client 402 selects an internal authentication device of a host device as an authentication device. Meanwhile, in the following step, a case in which the external authentication device 102 is selected will be described.

In step S905, the biometric authentication client 402 of the image processing apparatus 101 transmits a request for assertion creation to the external authentication device 102. The authentication parameter created in step S902, that is, the Attestation Challenge, is included in the request. In addition, a service ID and biological information acquisition destination information are included in the request. The biological information acquisition destination information includes information indicating the image processing apparatus 101 itself that performs the request for assertion creation, in other words, the image processing apparatus 101 requested by a user to provide a printing service in step S901.

This is because, in order to input biological information using the biological information sensor 211 of the image processing apparatus in the image processing apparatus 101 requested by a user to provide a printing service, the external authentication device 102 is required to transmit the request for the acquisition of biological information to the image processing apparatus. Therefore, the biometric authentication client 402 includes the biological information acquisition destination information in the request for assertion creation.

In step S906, the biometric authentication unit 412 of the external authentication device 102 transmits the request for the acquisition of biological information to the image processing apparatus 101 indicated by the biological information acquisition destination information included in the request received in step S905. In step S907, the biological information acquisition unit 403 of the image processing apparatus 101 displays a screen 802 (FIG. 8B) for requesting an input of biological information on the input and output apparatus 206, and waits until a user inputs his or her biological information. If a user's biological information is input, in step S908, the biological information acquisition unit 403 of the image processing apparatus 101 acquires the feature amount of the input biological information, and returns the feature amount as biological information to the external authentication device 102.

Meanwhile, similarly to step S708, communication from the image processing apparatus 101 to the external authentication device 102 in step S908 is performed using an encryption technique. For example, an SSL or the like for encrypting a communication path is used, but there is no limitation thereto. In addition, in step S908, it is preferable that the biological information transmitted from the image processing apparatus 101 to the external authentication device 102 is encrypted and transmitted using an encryption technique so that only the external authentication device 102 can perform decryption.

In step S909, the biometric authentication unit 412 of the external authentication device 102 executes a process of verifying biological information. In the process of verifying biological information, on the basis of the feature amount of the received biological information, a record (authentication information) coincident with the feature amount is specified from the authentication information (Table A) registered with the TPM 304. Specifically, biological information ID indicated by the feature amount is specified, and thus authentication information ID corresponding to the biological information and a private key are specified in Table A.

Here, if the authentication information is not able to be uniquely specified, or the biological information is not input from a user for a certain period of time, the biometric authentication unit 412 determines that the biometric authentication has failed, returns information indicating that effect to the image processing apparatus 101, and terminates the process shown in FIG. 9. On the other hand, if the authentication information is able to be uniquely specified, the biometric authentication unit 412 determines the biometric authentication has succeeded, and the process proceeds to step S910.

The biometric authentication unit 412 creates signature data obtained by encrypting the Assertion Challenge received in step S905 using the specified private key. Further, the biometric authentication unit 412 creates assertion information including the specified authentication information ID and the created signature data.

In step S911, the biometric authentication unit 412 returns the assertion information created in step S910 to the image processing apparatus 101. In step S912, the biometric authentication client 402 of the image processing apparatus 101 receives the assertion information. The printing application 401 of the image processing apparatus 101 then transmits the request for assertion verification to the service providing system 103. The request for assertion verification includes the assertion information received in step S911.

In step S913, the authentication processing unit 421 of the service providing system 103 executes a process of verifying assertion information. In the process of verifying assertion, first, the signature data included in the received assertion information is decrypted using a public key which is specified by the authentication information ID included in the same assertion information. The table shown in Table B is used in the specification of the public key. A decrypted value is created in step S902, and the verification of whether the value is coincident with the Assertion Challenge included in the authentication parameter is performed.

If the decrypted value is coincident with the Assertion Challenge created in step S902, the authentication processing unit 421 determines that user authentication has succeeded, and the process proceeds to step S914. On the other hand, if the decrypted value is not coincident with the Assertion Challenge created in step S902, the authentication processing unit 421 determines that the user authentication has failed, returns information indicating that effect to the image processing apparatus 101, and terminates the process shown in FIG. 9.

In step S914, the authentication processing unit 421 issues a token to a user who has succeeded in the user authentication in step S913. The token is used in order for the user to use a printing service. In step S915, the authentication processing unit 421 returns the token created in step S914 to the image processing apparatus 101.

In step S916, the printing application 401 of the image processing apparatus 101 transmits a request for the acquisition of a printing data list to the service providing system 103. The token received in step S915 is included in the request. In step S917, the printing data management unit 422 of the service providing system 103 acquires a user's printing data list corresponding to the token received in step S916 from printing data to be managed, and returns the printing data list to the image processing apparatus 101.

In step S918, the printing application 401 of the image processing apparatus 101 displays a screen 803 (FIG. 8C) for displaying the printing data list on the input and output apparatus 206, and waits until a user selects data to be printed and presses down a printing button 804. If the data to be printed is selected and the printing button 804 is pressed, in step S919, the printing application 401 transmits a request for the acquisition of the selected printing data to the service providing system 103. The request includes the token received in step S915, and information for specifying the printing data selected in step S918, for example, an identifier of the printing data.

In step S920, the printing data management unit 422 of the service providing system 103 acquires printing data designated from the printing data to be managed, and returns the printing data to the image processing apparatus 101. In step S921, the printing application 401 of the image processing apparatus 101 executes printing of the received printing data. If the printing is completed, the printing application 401 displays a screen 805 (FIG. 8D) indicating the completion of the printing on the input and output apparatus 206.

Hereinafter, a supplementary description will be given of a case in which, in step S904, the biometric authentication client 402 of the image processing apparatus 101 selects an internal authentication device as an authentication device, in accordance with the setting of a destination to save biological information. In this case, processes steps S905 to S911 are performed by the internal authentication device of the image processing apparatus 101 itself instead of the external authentication device 102.

A difference depending on whether the processes of steps S905 to S911 are performed by the external authentication device 102 or performed by the internal authentication device lies in the following point. If the processes are performed by the external authentication device 102 rather than the internal authentication device, the point is that an encryption process is performed in communication between the image processing apparatus 101 and the external authentication device 102, particularly, as in step S908.

In the process shown in FIG. 9, the biometric authentication is executed in the external authentication device 102 functioning as an authentication device of one or more image processing apparatuses rather than the image processing apparatus 101. Thereby, a user can use a printing service requiring biometric authentication without newly executing a process of registering biological information even in image processing apparatuses other than the image processing apparatus having the registration process executed therein.

As described above, according to the present embodiment, it is possible to improve user convenience in an environment where the user uses a plurality of devices, and to realize a secure authentication method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions This application claims the benefit of Japanese Patent Application No. 2017-213554, filed Nov. 6, 2017, which is hereby incorporated by reference wherein in its entirety.

What is claimed is:

1. An image processing apparatus provided with a biological information sensor, comprising:
   a memory storing instructions; and
   a processor executing the instructions causing the image processing apparatus to:
   receive an authentication request including a verification parameter from a service providing system on a first network;
   transmit the verification parameter to an information processing apparatus on a second network, wherein the information processing apparatus is provided with a tamper-resistant storage device and an authentication module for biometric authentication, the tamper-resistant storage device configured to store a user's biological information required when an authentication process is performed by the authentication module and a private key generated with respect to the stored biological information;
   transmit biological information acquired by the biological information sensor using an encryption technique to the information processing apparatus via the second network without the first network;
   receive signature data, created using (i) the verification parameter included with the authentication request received from the service providing system and (ii) the private key generated with respect to the stored biological information when biometric authentication based on the transmitted biological information has succeeded, from the information processing apparatus; and
   transmit the signature data to the service providing system.

2. The image processing apparatus according to claim 1, wherein the biological information acquired by the biological information sensor is transmitted to the information processing apparatus in accordance with a request from the information processing apparatus having the verification parameter received therein.

3. The image processing apparatus according to claim 1, wherein the image processing apparatus includes an authentication module for biometric authentication and a tamper-resistant storage device configured to store biological information.

4. The image processing apparatus according to claim 3, wherein the verification parameter is transmitted to the authentication module of the image processing apparatus in accordance with a setting.

5. The image processing apparatus according to claim 3, wherein:
   a setting is made of whether to use the authentication module of the information processing apparatus or to use the authentication module of the image processing apparatus as an authentication module for biometric authentication; and
   a determination is made of whether the verification parameter is transmitted to the authentication module of the information processing apparatus or is transmitted to the authentication module of the image processing apparatus in accordance with the setting.

6. The image processing apparatus according to claim 1, wherein a communication path through which the biological information acquired by the biological information sensor is transmitted to the information processing apparatus is encrypted.

7. The image processing apparatus according to claim 1, wherein the processor further executes the instructions causing the image processing apparatus to:
   receive a verification parameter for registration of authentication information from the service providing system;
   transmit the verification parameter for registration of the authentication information to the information processing apparatus;
   transmit biological information for registration acquired by the biological information sensor using an encryption technique to the information processing apparatus;
   receive signature data, created using a public key pairing with the private key generated with respect to the biological information for registration and the verification parameter received by the information processing apparatus, from the information processing apparatus; and
   transmit the signature data to the service providing system.

8. The image processing apparatus according to claim 1, wherein, when the verification parameter is transmitted to the information processing apparatus, information indicating an address of the image processing apparatus for the information processing apparatus to request acquisition of biological information from the image processing apparatus is transmitted.

9. A control method for controlling an image processing apparatus provided with a biological information sensor, the method comprising:
   receiving an authentication request including a verification parameter from a service providing system on a first network;
   transmitting the verification parameter to an information processing apparatus on a second network, wherein the information processing apparatus is provided with a tamper-resistant storage device and an authentication module for biometric authentication, the tamper-resistant storage device configured to store a user's biological information required when an authentication process is performed by the authentication module and a private key generated with respect to the stored biological information;
   transmitting biological information acquired by the biological information sensor using an encryption technique to the information processing apparatus via the second network without the first network;

receiving signature data, created using (i) the verification parameter included with the authentication request received from the service providing system and (ii) the private key generated with respect to the stored biological information when biometric authentication based on the transmitted biological information has succeeded, from the information processing apparatus; and transmitting the signature data to the service providing system.

10. A non-transitory storage medium having a computer program stored thereon, the program causing a computer to execute:

receiving an authentication request including a verification parameter from a service providing system on a first network;

transmitting the verification parameter to an information processing apparatus on a second network, wherein the information processing apparatus is provided with a tamper-resistant storage device and an authentication module for biometric authentication, the tamper-resistant storage device configured to store a user's biological information required when an authentication process is performed by the authentication module and a private key generated with respect to the stored biological information;

transmitting biological information acquired by the biological information sensor using an encryption technique to the information processing apparatus via the second network without the first network;

receiving signature data, created using (i) the verification parameter included with the authentication request received from the service providing system and (ii) the private key generated with respect to the stored biological information when biometric authentication based on the transmitted biological information has succeeded, from the information processing apparatus; and transmitting the signature data to the service providing system.

11. A system comprising:

an image processing apparatus provided with a biological information sensor; and an information processing apparatus provided with a tamper-resistant storage device and an authentication module for biometric authentication, the tamper-resistant storage device configured to store a user's biological information required when an authentication process is performed by the authentication module and a private key generated with respect to the stored biological information, wherein the image processing apparatus includes:

a first memory storing instructions; and a first processor executing the instructions causing the image processing apparatus to:

receive an authentication request including a verification parameter from a service providing system on a first network, transmit the verification parameter to the information processing apparatus, which is on a second network, transmit biological information acquired by the biological information sensor using an encryption technique to the information processing apparatus via the second network without the first network, receive signature data, created using (i) the verification parameter included with the authentication request received from the service providing system and (ii) the private key generated with respect to the stored biological information when biometric authentication based on the transmitted biological information has succeeded, from the information processing apparatus, and transmit the signature data to the service providing system, and wherein the information processing apparatus includes:

a second memory storing instructions; and a second processor executing the instructions causing the information processing apparatus to:

execute a biometric authentication process based on the transmitted biological information, create signature data using (i) the verification parameter included with the authentication request received from the service providing system and (ii) the private key generated with respect to the stored biological information when biometric authentication has succeeded, and transmit the signature data to the image processing apparatus using an encryption technique.

12. A control method for controlling a system including:

an image processing apparatus provided with a biological information sensor; and an information processing apparatus provided with a tamper-resistant storage device and an authentication module for biometric authentication, the tamper-resistant storage device configured to store a user's biological information required when an authentication process is performed by the authentication module and a private key generated with respect to the stored biological information, wherein the method comprises:

causing the image processing apparatus to receive an authentication request including a verification parameter from a service providing system on a first network;

causing the image processing apparatus to transmit the verification parameter to the information processing apparatus, which is on a second network;

causing the image processing apparatus to transmit biological information acquired by the biological information sensor using an encryption technique to the information processing apparatus via the second network without the first network;

causing the information processing apparatus to execute a biometric authentication process based on the transmitted biological information;

causing the information processing apparatus to create signature data using (i) the verification parameter included with the authentication request received from the service providing system and (ii) the private key generated with respect to the stored biological information when biometric authentication has succeeded;

causing the information processing apparatus to transmit the signature data to the image processing apparatus using an encryption technique; and causing the image processing apparatus to transmit the transmitted signature data to the service providing system.

* * * * *